United States Patent
Tsuruta et al.

(10) Patent No.: US 10,749,353 B2
(45) Date of Patent: Aug. 18, 2020

(54) ELECTRIC POWER TOOL (71) Applicant: Panasonic Intellectual Property Management Co., Ltd., Osaka (JP)

(72) Inventors: Naoki Tsuruta, Mie (JP); Masaki Ikeda, Mie (JP); Tatsuya Miwa, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 183 days.

(21) Appl. No.: 14/633,323

(22) Filed: Feb. 27, 2015

(65) Prior Publication Data
US 2016/0006279 A1 Jan. 7, 2016

(30) Foreign Application Priority Data

Jul. 1, 2014 (JP) .................. 2014-136097

(51) Int. Cl.
- *H02J 7/00* (2006.01)
- *B25F 5/00* (2006.01)
- *H02J 1/14* (2006.01)
- *B25F 5/02* (2006.01)

(52) U.S. Cl.
CPC ............ *H02J 7/0021* (2013.01); *B25F 5/00* (2013.01); *B25F 5/021* (2013.01); *H02J 1/14* (2013.01); *H02J 7/00* (2013.01); *H02J 7/007* (2013.01); *H02J 7/0031* (2013.01); *H02J 7/0063* (2013.01); *H02J 7/00306* (2020.01); *H02J 2007/0067* (2013.01)

(58) Field of Classification Search
CPC ......... H02J 7/0021; H02J 7/0052; H02J 7/007
USPC ................................................. 320/107, 112
See application file for complete search history.

(56) References Cited

U.S. PATENT DOCUMENTS

| | | | | |
|---|---|---|---|---|
| 2002/0149346 A1* | 10/2002 | Sakakibara | ........... | H02J 7/0031 320/162 |
| 2004/0070369 A1* | 4/2004 | Sakakibara | ............... | B25F 5/00 320/128 |
| 2006/0220605 A1* | 10/2006 | Funabashi | ........... | H01M 2/1022 318/434 |
| 2009/0071671 A1* | 3/2009 | Zhong | ................... | B23B 45/008 173/176 |
| 2010/0072974 A1* | 3/2010 | Uchida | .................. | G04C 10/02 323/318 |

(Continued)

FOREIGN PATENT DOCUMENTS

| | | |
|---|---|---|
| DE | 102009032251 A | 1/2011 |
| EP | 1 894 678 A2 | 3/2008 |

(Continued)

OTHER PUBLICATIONS

Extended European Search Report dated Nov. 27, 2015 for corresponding European Application No. 15157185.8.

*Primary Examiner* — Richard Isla
*Assistant Examiner* — Dung V Bui
(74) *Attorney, Agent, or Firm* — Renner, Otto, Boisselle & Sklar, LLP (57) ABSTRACT

An electric power tool that receives driving power from a rechargeable battery includes loads and a control circuit that controls supply of the driving power from the rechargeable battery to the loads. The control circuit sets and stores for each of the loads a reference voltage value of the rechargeable battery used for stopping or issuing a notification in order to obviate over-discharging of the rechargeable battery.

4 Claims, 2 Drawing Sheets

(56) References Cited

U.S. PATENT DOCUMENTS

| | | | |
|---|---|---|---|
| 2010/0085008 A1* | 4/2010 | Suzuki | B25F 5/00 320/112 |
| 2010/0085010 A1* | 4/2010 | Suzuki | B25F 5/00 320/132 |
| 2011/0005084 A1 | 1/2011 | Thorson et al. | |
| 2011/0031975 A1* | 2/2011 | Kawano | H01M 2/1022 324/433 |
| 2012/0274245 A1* | 11/2012 | Takano | B25F 5/00 318/139 |
| 2013/0021783 A1* | 1/2013 | Vanko | B25F 5/021 362/119 |
| 2013/0307550 A1* | 11/2013 | Densham | H01M 10/482 324/433 |

FOREIGN PATENT DOCUMENTS

| | | |
|---|---|---|
| EP | 2 017 943 A2 | 1/2009 |
| JP | 5-49283 U | 6/1993 |
| JP | 2004-291135 A | 10/2004 |
| JP | 2010-273412 A | 12/2010 |

* cited by examiner

Fig. 1

ELECTRIC POWER TOOL

BACKGROUND ART

The present invention relates to an electric power tool.

There are many power tools, such as electric drills, that are cordless to improve convenience and operability. A cordless power tool uses a rechargeable battery (battery pack) such as a lithium ion battery as a power supply for driving a motor.

Japanese Laid-Open Utility Model Patent Publication No. 5-49283 describes an electric power tool provided with an illumination means to illuminate dark places so that the power tool can be used even in a dark place. The electric power tool includes a first switch for operating the electric drill (driving the motor) and a second switch for lighting the illumination means (penlight), which is arranged on the electric drill body. The second switch is operated independently from the first switch.

When switching on the first switch to drive the electric drill (motor), the second switch is switched off to deactivate the illumination means if light is sufficient, and the second switch is activated to activate the illumination means if light is insufficient.

In order to protect the rechargeable battery from over-discharging, this type of electric power tool includes a function for stopping the motor if the voltage value of the rechargeable battery reaches a predetermined reference voltage value when the motor is driven. The reference voltage value is acquired from the discharge characteristics (battery voltage relative to discharge capacity) of the rechargeable battery when the motor is driven.

Therefore, in the electric power tool of Japanese Laid-Open Utility Model Patent Publication No. 5-49283, the rechargeable battery is protected from over-discharging by using the reference voltage value acquired from the discharge characteristics of the rechargeable battery under the condition that the motor is driven.

When only the illumination means is activated, the illumination means is deactivated if the voltage value of the rechargeable battery reaches the reference voltage value, which is acquired from the discharge characteristics of the rechargeable battery under the condition that the motor is driven, to protect the rechargeable battery from over-discharging.

SUMMARY OF THE INVENTION

The load current (current flowing through LED) for activating the illumination means is smaller than the load current (current flowing through motor) for driving the motor. The discharge characteristics of the rechargeable battery when only the illumination means is activated differ from the discharge characteristics of the rechargeable battery when the motor is driven.

Thus, when only the illumination means is activated and the motor is then driven, the discharge characteristics of the rechargeable battery changes from the discharge characteristics of when only the illumination means is activated to the discharge characteristics of when the motor is driven. Even of the voltage value of the rechargeable battery does not reach the reference voltage value when only the illumination means is illuminated, the change in the discharge characteristics may lead to over-discharging. In such a case, it may be difficult to prevent over-discharging.

Further, when the discharge characteristics of the rechargeable battery changes from the discharge characteristics of when only the illumination means is activated to the discharge characteristics of when the motor is driven, a voltage drop may occur in the rechargeable battery. In such a case, when the voltage to the control circuit is insufficient, the control circuit may fail to perform normally.

Accordingly, it is an object of the present invention to provide an electric power tool that prevents over-discharging of the rechargeable battery in response to a plurality of loads.

One aspect of the present invention is an electric power tool that receives driving power from a rechargeable battery includes loads and a control circuit that controls supply of the driving power from the rechargeable battery to the loads. The control circuit sets and stores for each of the loads a reference voltage value of the rechargeable battery used for stopping the supply of the driving power to the rechargeable battery or issuing a notification in order to obviate over-discharging of the rechargeable battery.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

An electric power tool 1 will now be described by referring to the electric block circuit diagram of FIG. 1, which illustrates the electric configuration of the electric power tool 1. The electric power tool 1 is of a rechargeable type in which a detachable battery pack 2 is attached to an electric power tool body.

Rechargeable Battery B

Figure 1:
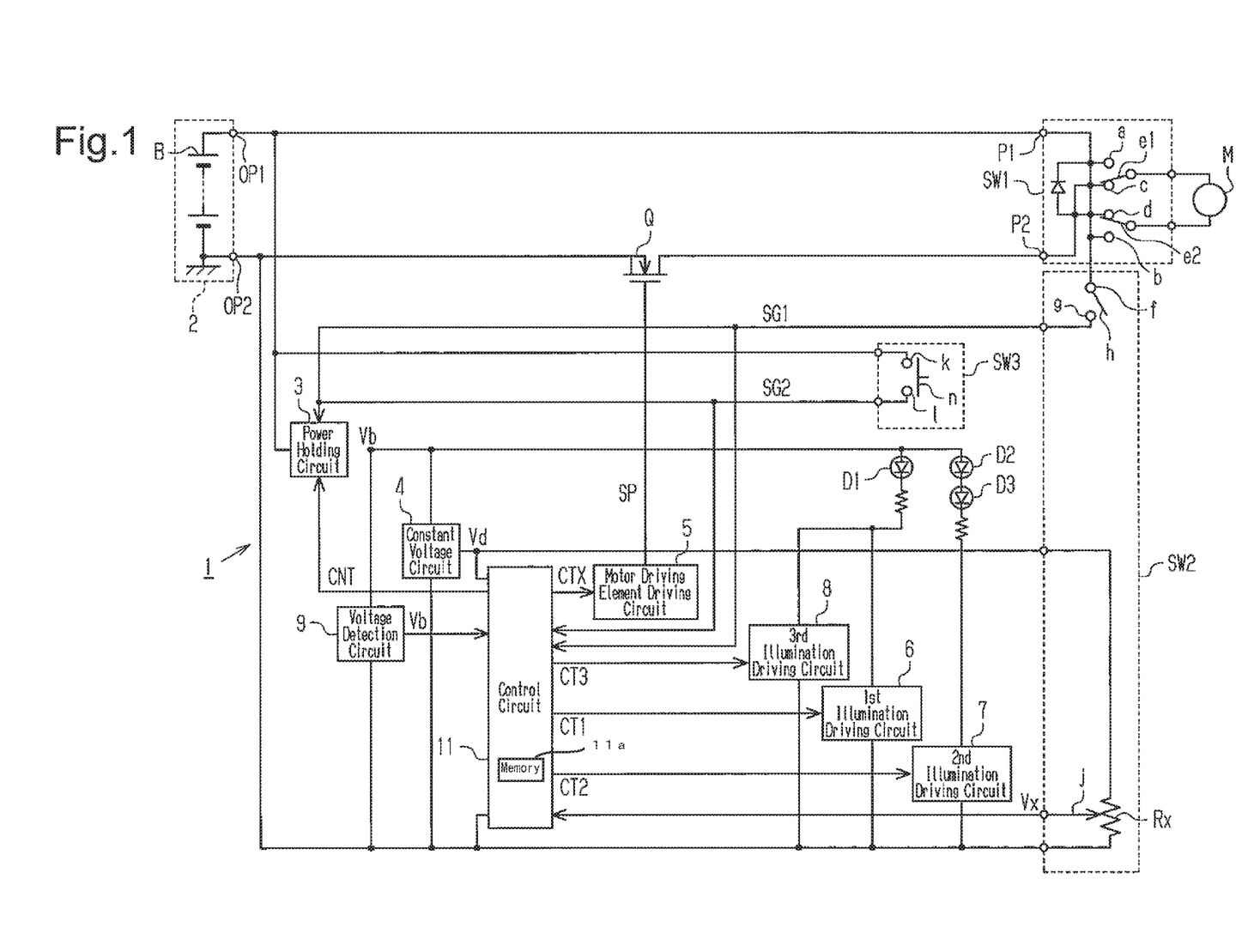
FIG. 1 is an electric block circuit diagram illustrating the electric configuration of one embodiment of an electric power tool.

As illustrated in FIG. 1, the electric power tool 1 is connected to a rechargeable battery B built in a battery pack 2 detachably attached to the electric power tool body. The rechargeable battery B serves as a driving power supply for the electric power tool 1. The rechargeable battery B is formed by connecting a plurality of battery cells in series, and each battery cell is formed by a lithium ion battery cell in this embodiment.

The rechargeable battery B has a positive external terminal OP1 and a negative external terminal OP2. The positive external terminal OP1 of the rechargeable battery B is connected to a positive terminal P1 of a switching switch SW1, and the negative external terminal OP2 of the rechargeable battery B is connected to a negative terminal P2 of the switching switch SW1 through a switching element Q.

Switching Switch SW1

The switching switch SW1 is a switch for switching the direction of the rotation generated by a motor M, which is accommodated in the electric power tool body, between forward and rearward directions. The motor M has an operation portion operably provided on a housing surface of the electric power tool body. The switching switch SW1 has a first contact a and a second contact b, which are connected to the positive terminal P1, and a third contact c and a fourth contact d, which are connected to the negative terminal P2. Further, the switching switch SW1 has a first movable terminal e1 and a second movable terminal e2.

The first movable terminal e1 and the second movable terminal e2 move in cooperation the operation portion of the switching switch SW1. When the operation portion of the switching switch SW1 is set to a forward rotation position, the first movable terminal e1 is connected to the first contact a, and the second movable terminal e2 is connected to the fourth terminal d. When the operation portion of the switching switch Sw1 is set to a rearward rotation position, the first movable terminal e1 is connected to the third contact c, and the second movable terminal e2 is connected to the second contact b. Further, when the operation portion of the switching switch SW1 is set to a stop holding position, the first movable terminal e1 is connected to the third contact c, and the second movable terminal e2 is connected to the fourth contact d.

Motor M

The first and second movable terminals e1 and e2 of the switching switch SW1 are connected to the motor M, which is accommodated in the electric power tool body. The motor M is a DC motor and receives driving power from the rechargeable battery B through the first and second movable terminals e1 and e2. The motor M generates forward rotation when the driving power of the rechargeable battery B is received under a condition in which the switching switch SW1 is set to the forward rotation position and generates rearward rotation when the driving power of the rechargeable battery B is received under a condition in which the switching switch SW1 is set to the rearward rotation position. Then, the rotation of the motor M is transmitted to the tool projecting toward the front from the electric power tool body through a reduction gear mechanism in the electric power tool body, and the tool rotates in accordance with the rotation of the motor M.

Trigger Switch SW2

The positive terminal P1 of the switching switch SW1 is connected to a trigger switch SW2. The trigger switch SW2 is a switch for starting the motor M. A trigger, which serves as an operation portion, is provided on a grip of the electric power tool body. The trigger switch SW2 has a first contact f, a second contact g, and a movable terminal h. The trigger switch SW2 moves so that the movable terminal h connects and disconnects the first and second contacts f and g by operating an operation portion (trigger).

In more detail, by pulling the operation portion (trigger), the movable terminal h connects the first contact f and the second contact g to each other. As a result, the positive external terminal OP1 of the rechargeable battery B and a power holding circuit 3 are electrically connected via the movable terminal h of the trigger switch SW2. That is, by pulling the operation portion (trigger), battery voltage Vb of the rechargeable battery B is supplied as an ON operation signal SG1 of the trigger switch SW2 to the power holding circuit 3. The ON operation signal SG1 is also sent to a control circuit 11.

By releasing the operation portion (trigger), the movable terminal h disconnects the first contact f from the second contact g. As a result, the positive external terminal OP1 of the rechargeable battery B and the power holding circuit 3 are electrically disconnected. That is, by releasing the operation portion (trigger), the ON operation signal SG1 to the power holding circuit 3 and the control circuit 11 is lost.

Further, the trigger switch SW2 has a variable resistance Rx. A positive terminal of the variable resistance Rx is connected to a constant voltage circuit 4, while a negative terminal of the variable resistance Rx is connected to the ground. A constant voltage (operation voltage Vd) generated in the constant voltage circuit 4 is applied to the variable resistance Rx. The variable resistance Rx has a slide terminal j. The slide terminal j slides between the positive side and the negative side terminals of the variable resistance Rx corresponding to an operation amount of the operation portion (trigger). Then, voltage corresponding to the operation amount of the operation portion (trigger) is supplied as an operation amount detection voltage Vx from the slide terminal j to the control circuit 11.

Switching Element Q, Motor Driving Element Driving Circuit 5

The switching element Q is formed by a MOS transistor in this embodiment, in which a drain terminal is connected to the negative terminal P2 of the switching switch SW1, and a source terminal is connected to the negative external terminal OP2 of the rechargeable battery B. The motor driving element driving circuit 5 is connected to a gate terminal of the switching element Q. The motor driving element driving circuit 5 supplies the gate terminal with a pulse signal SP for switching on/off the switching element Q.

The pulse signal SP supplied to the gate terminal is generated by performing pulse width modulation (PWM) based on the operation amount detection voltage Vx corresponding to the operation amount of the operation portion (trigger).

Therefore, the switching element Q is switched on/off by the pulse signal subjected to PWM control and controls the time for supplying the driving power from the rechargeable battery B to the motor M. That is, by operating the trigger switch SW2 when the switching switch SW1 is set to forward rotation or rearward rotation, rotation of the motor M is controlled.

Light Switch SW3

An automatic reset type light switch SW3 is connected to the positive external terminal OP1 of the rechargeable battery B. The light switch SW3 has an operation portion operably provided on the electric power tool body and is a switch for selectively switching on three light emitting diodes (LED) D1 to D3 illuminating the front of the electric power tool body (front of the fastened tool). The light switch SW3 has a first contact k, a second contact 1, and a movable terminal n. The light switch SW3 moves so that the movable terminal n connects and disconnects the first and second contacts k and 1 by switching on and off the operation portion.

In more detail, by pressing down and switching on the operation portion, the movable terminal n connects the first contact k and the second contact 1 to each other. As a result, the positive external terminal OP1 of the rechargeable battery B and the power holding circuit 3 are electrically connected via the movable terminal n of the light switch SW3. That is, by activating the operation portion, the battery voltage Vb of the rechargeable battery B is supplied as an ON operation signal SG2 of the light switch SW3 to the power holding circuit 3. Further, the ON operation signal SG2 is also supplied to the control circuit 11.

By operating and switching off the operation portion, the movable terminal n disconnects the first contact k from the second contact 1. As a result, the positive external terminal OP1 of the rechargeable battery B and the power holding circuit 3 are electrically disconnected. That is, by releasing the operation portion, the ON operation signal SG2 to the power holding circuit 3 and the control circuit 11 is lost.

Power Holding Circuit 3

The power holding circuit 3 is connected to the positive external terminal OP1 of the rechargeable battery B, the trigger switch SW2, and the light switch SW3. The power holding circuit 3 responds to the ON operation signal SG1 from the trigger switch SW2 or the ON operation signal SG2 of the light switch SW3 and outputs the battery voltage Vb of the rechargeable battery B. In this embodiment, once the ON operation signal SG1 or the ON operation signal SG2 is received, the power holding circuit 3 keeps outputting the battery voltage Vb of the rechargeable battery B until receiving a control instruction signal CNT from the control circuit 11.

First to Third Light Emitting Diodes D1 to D3, First to Third Illumination Driving Circuits 6 to 8

The three first to third light emitting diodes D1 to D3 are provided on a housing of the electric power tool body. The first light emitting diode D1 is provided on an upper part at the front center portion of the housing. The second light emitting diode D2 is provided on the left side of the front center portion. The third light emitting diode D3 is provided on the right side of the front center portion.

The first light emitting diode D1 has an anode terminal connected to the power holding circuit 3 so that the battery voltage Vb of the rechargeable battery B is received via the power holding circuit 3. Further, a cathode terminal of the first light emitting diode D1 is connected to the ground via a first illumination driving circuit 6. The first illumination driving circuit 6 is a circuit for activating and deactivated the first light emitting diode D1.

The second and third light emitting diodes D2 and D3 are connected in series. An anode terminal of the second light emitting diode D2 is connected to the power holding circuit 3, and the battery voltage Vb of the rechargeable battery B is applied to the anode terminal via the power holding circuit 3. Further, a cathode terminal of the third light emitting diode D3 is connected to the ground via a second illumination driving circuit 7. The second illumination driving circuit 7 is a circuit for allowing or restricting the second and third light emitting diodes D2 and D3 to emit light by activating the second and third light emitting diodes D2 and D3, which are connected in series.

The first to third light emitting diodes D1 to D3 emit light when activated and do not emit light when deactivated. When the first to third light emitting diodes D1 to D3 are activated, each light illuminates the front of the tool attached to the electric power tool body.

The cathode terminal of the first light emitting diode D1 is connected to the ground via a third illumination driving circuit 8. The third illumination driving circuit 8 activates and deactivates the first light emitting diode D1. The third illumination driving circuit 8 is able to activate and illuminate the first light emitting diode D1 even if the first light emitting diode D1 is deactivated by the first illumination driving circuit 6.

Constant Voltage Circuit 4

The constant voltage circuit 4 receives the battery voltage Vb from the power holding circuit 3, generates the operation voltage Vd of the control circuit 11 and delivers the operation voltage Vd to the control circuit 11. Further, the operation voltage Vd generated by the constant voltage circuit 4 is also applied to the variable resistance Rx of the trigger switch SW2.

Voltage Detection Circuit 9

A voltage detection circuit 9 detects the battery voltage Vb of the rechargeable battery B outputted by the power holding circuit 3 and supplies the detected detection voltage (battery voltage Vb of the rechargeable battery B) to the control circuit 11.

Control Circuit 11

The control circuit 11 includes a microcomputer and integrally controls the motor driving element driving circuit 5 and the first to third illumination driving circuits 6 to 8. The control circuit 11 executes a motor driving processing operation for driving and controlling the motor M, an illumination control processing operation for illuminating and controlling the first to third light emitting diodes D1 to D3, and an over-discharging restriction processing operation for preventing over-discharging of the rechargeable battery B.

Motor Driving Processing Operation

When the control circuit 11 receives the ON operation signal SG1 from the trigger switch SW2 and determines that the trigger switch SW2 is activated, the control circuit 11 supplies a driving control signal CTX for activating and deactivating the switching element Q to the motor driving element driving circuit 5.

The control circuit 11 receives the operation amount detection voltage Vx from the slide terminal j of the variable resistance Rx in the trigger switch SW2 and determines the present operation amount of the operation portion (trigger). Then, the control circuit 11 supplies, to the motor driving element driving circuit 5, the driving control signal CTX for outputting a pulse signal SP subjected to pulse width modulation according to the present operation amount of the operation portion (trigger) to the switching element Q.

When the ON operation signal SG1 is lost and the operation amount of the operation portion (trigger) becomes zero, the control circuit 11 sends the driving control signal CTX for deactivating the switching element Q to the motor driving element driving circuit 5.

Illumination Control Processing Operation

The control circuit 11 receives the ON operation signal SG2 from the light switch SW3. The control circuit 11 changes the mode for illuminating the first to third light emitting diodes D1 to D3 in response to the ON operation signal SG2 received whenever the light switch SW3 is operated.

In more detail, if the ON operation signal SG2 is received when the first to third light emitting diodes D1 to D3 are all deactivated (complete deactivation mode), the control circuit 11 activates only the first light emitting diode D1 (one-point illumination mode). That is, the control circuit 11 supplies a first illumination control signal CT1 to the first illumination driving circuit 6 for electrically activating the first light emitting diode D1 with the first illumination driving circuit 6.

Subsequently, when a new ON operation signal SG2 is received in the one-point illumination mode, the control circuit 11 deactivates the first light emitting diode D1 and activates the second and third light emitting diodes D2 and D3 (two-point illumination mode). That is, the control circuit 11 eliminates the first illumination control signal CT1 and sends a second illumination control signal CT2 to the second illumination driving circuit 7 for electrically conducting the second and third light emitting diodes D2 and D3 in the second illumination driving circuit 7.

Subsequently, when a new ON operation signal SG2 is received in the two-point illumination mode, the control circuit 11 activates all of the first to third light emitting diodes D1 to D3 (full illumination mode). That is, the control circuit 11 sends the first illumination control signal CT1 to the first illumination driving circuit 6 when the second illumination control signal CT2 is send to the second illumination driving circuit 7.

Subsequently, when a new ON operation signal SG2 is received in this full illumination mode, the control circuit 11 deactivates all of the first to third light emitting diodes D1 to D3 (full deactivation mode). That is, the control circuit 11 eliminates the first illumination control signal CT1 sent to the first illumination driving circuit 6 and the second illumination control signal CT2 sent to the second illumination driving circuit 7.

Subsequently, the control circuit 11 repeats each illumination mode in the order of the one-point illumination mode, the two-point illumination mode, the full illumination mode, and the full deactivation mode whenever the ON operation signal SG2 is received. That is, the control circuit 11 has a counter reset to "0" when four ON operation signals SG2 are counted, and the control circuit 11 is operated in each illumination mode in accordance with a counter value of the counter. The control circuit 11 is in the full deactivation mode when the count value is "0", the one-point illumination mode when the count value is "1", the two-point illumination mode when the count value is "2", and the full illumination mode when the count value is "3".

The control circuit 11 changes the illumination mode when the trigger switch SW2 is activated. That is, if the control circuit 11 receives the ON operation signal SG1 from the trigger switch SW2 in the full deactivation mode when the count value is "0", the control circuit 11 sends a third illumination control signal CT3 to the third illumination driving circuit 8 in response to the ON operation signal SG1. That is, the control circuit 11 indicates that the motor M is driven by activating the first light emitting diode D1 via the third illumination driving circuit 8 regardless of the full deactivation mode.

Then, if the light switch SW3 is activated when the trigger switch SW2 is activated, the control circuit 11 controls the first and second illumination driving circuits 6 and 7 as described above based on the count value when the count value of the counter is "1" to "3".

Over-Discharging Restriction Processing Operation

The control circuit 11 performs an over-discharging restriction processing operation to restrict over-discharging of the rechargeable battery B. The over-discharging prevention processing has first to four over-discharging restriction processing operations.

First Over-Discharging Restriction Processing Operation

A first over-discharging restriction processing operation is performed to monitor the rechargeable battery B so that it does not become over-discharged when the motor M is driven and stops power supply to the motor M before the rechargeable battery B is over-discharged.

Specifically, when the control circuit 11 receives the ON operation signal SG1, the control circuit 11 determines that the trigger switch SW2 is activated and executes a first over-discharging restriction processing operation. In the first over-discharging restriction processing operation, the control circuit 11 compares a first reference voltage value Vk1 for the first over-discharging restriction processing operation, which is stored in a memory 11a of the control circuit 11, with the present battery voltage Vb of the rechargeable battery B received from the voltage detection circuit 9.

Figure 2:
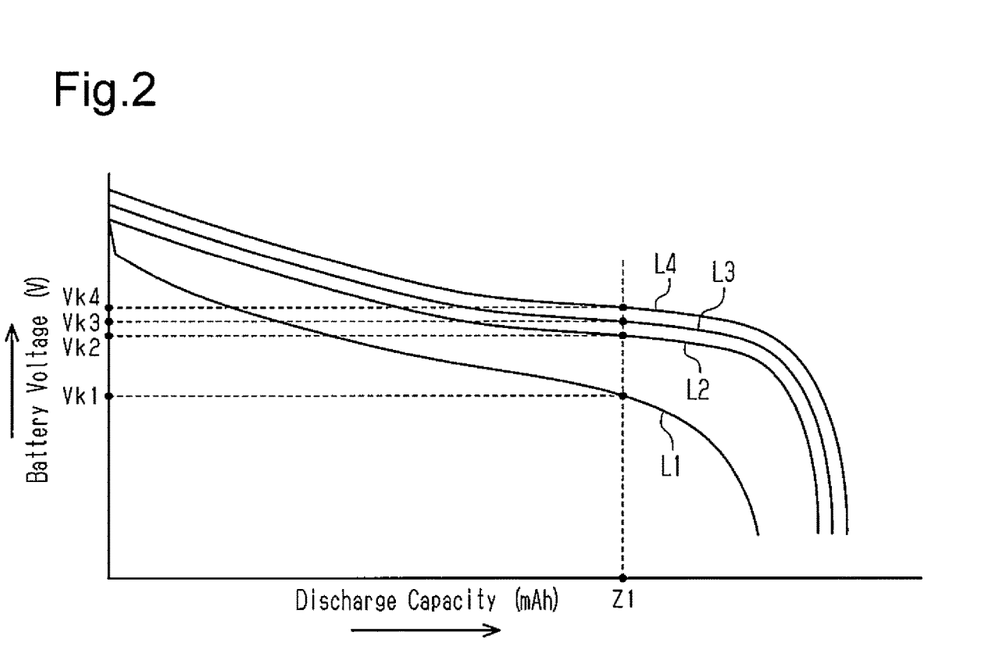
FIG. 2 is a graph illustrating the discharge characteristics of the rechargeable battery when driving a motor and the discharge characteristics of the rechargeable battery in different illumination modes.

The first reference voltage value Vk1 is a value of the battery voltage Vb immediately before the rechargeable battery B is over-discharged when the motor M is being driven by the rechargeable battery B. The first reference voltage value Vk1 is acquired based on the discharge characteristics of the rechargeable battery B when the motor M is driven by the rechargeable battery B. As illustrated in FIG. 2, the discharge characteristic (battery voltage to the discharge capacity) of the rechargeable battery B when the motor M is driven by the rechargeable battery B is indicated by a characteristic line L1. When the discharge capacity immediately before the over-discharging from the characteristic line L1 is point Z1, the value of the battery voltage Vb to the discharge capacity at point Z1 is set to the first reference voltage value Vk1.

This first reference voltage value Vk1 is acquired through tests, experiments, calculations and the like in advance and is stored in the memory 11a of the control circuit 11.

Then, when the battery voltage Vb of the rechargeable battery B decreases and reaches the first reference voltage value Vk1, the control circuit 11 determines that the rechargeable battery B will be over-discharged if the motor M is continuously driven. When determining that the rechargeable battery B will be over-discharged, the control circuit 11 supplies the driving control signal CTX for turning off the switching element Q to the motor driving element driving circuit 5 even though the trigger switch SW2 is activated. As a result, the switching element Q is deactivated, power supply to the motor M is stopped, and the motor M is deactivated.

Second Over-Discharging Restriction Processing Operation

A second over-discharging restriction processing operation is performed to monitor the rechargeable battery B so that it does not become over-discharged when driving power is not supplied to the motor M and the motor M is driven with the first to third light emitting diodes D1 to D3 all illuminated (full illumination mode).

Specifically, when the control circuit 11 has not received the ON operation signal SG1 from the trigger switch SW2 and the count value of the counter in the control circuit 11 is "3", the control circuit 11 executes the second over-discharging restriction processing operation. The control circuit 11 compares a second reference voltage value Vk2 for the second over-discharging restriction processing operation stored in the memory 11a of the control circuit 11 with the present battery voltage Vb of the rechargeable battery B received from the voltage detection circuit 9.

The second reference voltage value Vk2 is a value of the battery voltage Vb immediately before the rechargeable battery B is over-discharged when the motor M is driven in the full illumination mode in which the first to third light emitting diodes D1 to D3 are all illuminated.

In more detail, as illustrated in FIG. 2, the discharge characteristics (battery voltage to the discharge capacity) of the rechargeable battery B when the first to third light emitting diodes D1 to D3 are all illuminated without driving the motor M is indicated by a characteristic line L2 and greatly differs from the characteristic line L1. Since the load current flowing through the first to third light emitting diodes D1 to D3 is much smaller than the load current flowing through the motor M when the motor M is driven, the characteristic line L2 that takes into consideration the battery voltage Vb is higher than the characteristic line L1. Further, the characteristic line L2 has greater discharge capacity than the characteristic line L1.

Accordingly, it may be understood that the discharge capacity immediately before the rechargeable battery B is over-discharged when the first to third light emitting diodes D1 to D3 are all illuminated without driving the motor M is much larger than point Z1 indicated on the characteristic line L1.

However, if the motor M is driven when the first to third light emitting diodes D1 to D3 are illuminated, the discharge characteristics of the rechargeable battery B changes from the characteristic line L2 to the characteristic line L1. Then, when the characteristic changes, the battery voltage Vb of the rechargeable battery B needs to be greater than or equal to the first reference voltage value Vk1 at the discharge capacity of the point Z1 so that the rechargeable battery it is not immediately over-discharged.

That is, the battery voltage Vb at the discharge capacity of point Z1 on the characteristic line L2 is set to the second reference voltage value Vk2.

As a result, before the battery voltage Vb reaches the second reference voltage value Vk2 when the first to third light emitting diodes D1 to D3 are illuminated, the battery voltage Vb of the rechargeable battery B is greater than or equal to the first reference voltage value Vk1 if the discharge characteristics of the rechargeable battery B changes from the characteristic line L2 to the characteristic line L1. That is, the rechargeable battery B is not over-discharged.

The second reference voltage value Vk2 is acquired through tests, experiments, calculations, and the like in advance and is stored in the memory 11a of the control circuit 11.

The control circuit 11 determines that the rechargeable battery B will be over-discharged if the motor M is driven when the illumination of the first to third light emitting diodes D1 to D3 has lowered the battery voltage Vb of the rechargeable battery B to the second reference voltage value Vk2.

The control circuit 11 determines that the rechargeable battery B will be over-discharged if the motor M is driven. Thus, the control circuit 11 eliminates the first and second illumination control signals CT1 and CT2 for deactivating the first to third light emitting diodes D1 to D3 regardless of the full illumination mode. As a result, the first and second illumination driving circuits 6 and 7 stops the supply of power to the first to third light emitting diodes D1 to D3 and deactivate the first to third light emitting diodes D1 to D3.

Third Over-Discharging Restriction Processing Operation

A third over-discharging restriction processing operation is performed to monitor the rechargeable battery B so that it does not become over-discharged when driving power is not supplied to the motor M and the motor M is driven with only the first light emitting diode D1 illuminated (one-point illumination mode).

Specifically, the control circuit 11 executes the third over-discharging restriction processing operation when the ON operation signal SG1 from the trigger switch SW2 is not supplied and the count value of the counter in the control circuit 11 is "1". The control circuit 11 compares a third reference voltage value Vk3 for the third over-discharging restriction processing operation stored in the memory 11a of the control circuit 11 with the present battery voltage Vb of the rechargeable battery B received from the voltage detection circuit 9.

The third reference voltage value Vk3 is a value of the battery voltage Vb immediately before the rechargeable battery B is over-discharged when the motor M is driven in the one-point illumination mode in which only the first light emitting diode D1 is illuminated.

In more detail, as illustrated in FIG. 2, the discharge characteristics (battery voltage to the discharge capacity) of the rechargeable battery B when only the first light emitting diode D1 is illuminated without driving the motor M is indicated by a characteristic line L3 and differs from the characteristic line L2. Since a load current flowing only through the first light emitting diode D1 is smaller than the load current flowing through the first to third light emitting diodes D1 to D3, the changing battery voltage Vb is higher than the battery voltage Vb of the characteristic line L2. The characteristic line L3 has a greater discharge capacity than the characteristic line L2.

It may be understood that the discharge capacity immediately before the rechargeable battery B is over-discharged when the first light emitting diodes D1 to D3 are illuminated without driving the motor M is greater than the discharge capacity immediately before the over-discharging indicated by the characteristic line L2.

However, if the motor M is driven when only the first light emitting diode D1 is illuminated, the discharge characteristics of the rechargeable battery B changes from the characteristic line L3 to the characteristic line L1. When the characteristics change, the battery voltage Vb of the rechargeable battery B needs to be greater than or equal to the first reference voltage value Vk1 at the discharge capacity of point Z1 so that the rechargeable battery B does not immediately become over-discharged.

That is, the battery voltage Vb at the discharge capacity of the point Z1 on the characteristic line L3 is set to the third reference voltage value Vk3.

As a result, before the battery voltage Vb reaches the third reference voltage value Vk3 when only the first light emitting diode D1 is illuminated, the battery voltage Vb of the rechargeable battery B is greater than or equal to the first reference voltage value Vk1 if the discharge characteristics of the rechargeable battery B changes from the characteristic line L3 to the characteristic line L1. That is, the rechargeable battery B is not over-discharged.

The third reference voltage value Vk3 is acquired through tests, experiments, calculations, and the like in advance and stored in the memory 11a of the control circuit 11.

The control circuit 11 determines that the rechargeable battery B will be over-discharged if the motor M is driven when the illumination of only the first light emitting diode D1 has lowered the battery voltage Vb of the rechargeable battery B to the third reference voltage value Vk3.

The control circuit 11 determines that the rechargeable battery B will be over-discharged if the motor M is driven. Thus, the control circuit 11 eliminates the first illumination control signal CT1 in order to deactivate the first light emitting diode D1 regardless of the one-point illumination mode. As a result, the first illumination driving circuit 6 stops the supply of power to the first light emitting diode D1 and deactivates the first light emitting diode D1.

Fourth Over-Discharging Restriction Processing Operation

A fourth over-discharging restriction processing operation is performed to monitor the rechargeable battery B so that it does not become over-discharged when driving power is not supplied to the motor M and the motor M is driven with the second and third light emitting diodes D2 and D3 illuminated (two-point illumination mode).

Specifically, when the ON operation signal SG1 is not supplied from the trigger switch SW2 and the count value of the counter in the control circuit 11 is "2", the control circuit 11 executes the fourth over-discharging restriction processing operation. The control circuit 11 compares a fourth reference voltage value Vk4 for the fourth over-discharging restriction processing operation stored in the memory 11a of the control circuit 11 with the present battery voltage Vb of the rechargeable battery B received from the voltage detection circuit 9.

The fourth reference voltage value Vk4 is the battery voltage Vb immediately before the rechargeable battery B is over-discharged even if the motor M is driven when the second and third light emitting diodes D2 and D3 are illuminated in the two-point illumination mode.

In further detail, as illustrated in FIG. 2, the discharge characteristics (battery voltage to the discharge capacity) of the rechargeable battery B when the second and third light emitting diodes D2 and D3 are illuminated without driving the motor M is indicated by a characteristic line L4, which differs from the characteristic line L3.

In the characteristic line L4, the load current flowing through the second and third light emitting diodes D2 and D3 is smaller than the load current flowing through only the first light emitting diode D1, and the battery voltage Vb is higher than the battery voltage Vb of the characteristic line L3. The characteristic line L4 has a greater discharge capacity than the characteristic line L3.

It may be understood that the discharge capacity immediately before the rechargeable battery B is over-discharged when the second and third light emitting diodes D2 and D3 are illuminated without driving the motor M is greater than the discharge capacity immediately before the over-discharging indicated on the characteristic line L3.

However, if the motor M is driven when the second and third light emitting diodes D2 and D3 are illuminated, the discharge characteristics of the rechargeable battery B changes from the characteristic line L3 to the characteristic line L1. When the characteristics change, the battery voltage Vb of the rechargeable battery B is greater than or equal to the first reference voltage value Vk1 relative to the discharge capacity at point Z1 so that it is not over-discharged immediately.

That is, the battery voltage Vb with respect to the discharge capacity of the point Z1 on the characteristic line L4 is set to the fourth reference voltage value Vk4. As a result, before the battery voltage Vb reaches the fourth reference voltage value Vk4 when only the second and third light emitting diodes D2 and D3 are illuminated, the battery voltage Vb is greater than or equal to the first reference voltage value Vk1 even if the discharge characteristics of the rechargeable battery B changes from the characteristic line L4 to the characteristic line L1. That is, the rechargeable battery B does not become over-discharged.

The fourth reference voltage value Vk4 is acquired through tests, experiments, calculations, and the like in advance and is stored in the memory 11a of the control circuit 11.

Then, the control circuit 11 determines that the rechargeable battery B is over-discharged if the motor M is driven when the illumination of the second and third light emitting diodes D2 and D3 lowers the battery voltage Vb of the rechargeable battery B to the fourth reference voltage value Vk4.

The control circuit 11 determines that the rechargeable battery B will be over-discharged if the motor M is driven and eliminates the second illumination control signal CT2 in order to deactivate the second and third light emitting diodes D2 and D3 regardless of the two-point illumination mode. As a result, the second illumination driving circuit 7 stops the supply of power to the second and third light emitting diodes D2 and D3 and deactivates the second and third light emitting diodes D2 and D3.

In the electric power tool 1 of the present embodiment, when the motor M is driven and the first to third light emitting diodes D1 to D3 are illuminated in any one of the illumination modes, the control circuit 11 executes the first over-discharging restriction processing operation. The load current flowing through the motor M is much larger than the load current flowing through the first to third light emitting diodes D1 to D3. Further, the discharge characteristics of the motor M combined with the first to third light emitting diodes D1 to D3 is similar to the discharge characteristics of only the motor M. Therefore, the control circuit 11 determines whether or not the rechargeable battery B will be over-discharged by comparing the battery voltage Vb of the rechargeable battery B from the voltage detection circuit 9 with the first reference voltage value Vk1.

Further, the control circuit 11 is connected to the power holding circuit 3. When a situation in which the motor M is stopped and the first to third light emitting diodes D1 to D3 are deactivated continue for a predetermined period of time, the control circuit 11 supplies the control instruction signal CNT to the power holding circuit 3, and the power holding circuit 3 stops generating the battery voltage Vb of the rechargeable battery B. As a result, the operation voltage Vd for operating the control circuit 11 is also stopped and the control circuit 11 stops operating. This reduces power consumption of the rechargeable battery B.

The operation of the electric power tool 1 will now be described.

The operation portion of the switching switch SW1 is set to the forward rotation position, and the user pulls the trigger of the trigger switch SW2. Then, the motor M is activated by the battery voltage Vb of the rechargeable battery B, and the power holding circuit 3 supplies the battery voltage Vb of the rechargeable battery B to the constant voltage circuit 4 in response to the ON operation signal SG1 from the trigger switch SW2. The constant voltage circuit 4 receives the battery voltage Vb, generates the operation voltage Vd, and sends the operation voltage Vd to the control circuit 11. The constant voltage circuit 4 also applies the operation voltage Vd to the variable resistance Rx of the trigger switch SW2.

The control circuit 11 receives the ON operation signal SG1 from the trigger switch SW2 and determines that the trigger switch SW2 has been operated and simultaneously executes the motor driving processing operation and the first over-discharging restriction processing operation.

The control circuit 11 receives the operation amount detection voltage Vx according to the operation amount of the trigger of the trigger switch SW2 from the variable resistance Rx and specifies the present operation amount of the trigger. The control circuit 11 supplies the driving control signal CTX for supplying the pulse signal SP subjected to pulse width modulation according to the present operation amount of the trigger to the switching element Q to the motor driving element driving circuit 5. As a result, the motor M rotates in accordance with the operation amount of the trigger of the trigger switch SW2.

The control circuit 11 receives the present battery voltage Vb of the rechargeable battery B from the voltage detection circuit 9 and compares the battery voltage Vb with the first reference voltage value Vk1 stored in the memory 11a in the control circuit 11. Then, when the battery voltage Vb of the rechargeable battery B reaches the first reference voltage value Vk1, the control circuit 11 supplies the driving control signal CTX for deactivating the switching element Q to the motor driving element driving circuit 5. As a result, the rechargeable battery B is prevented from being over-discharged.

Further, if the user operates the light switch SW3 when the motor M is not driven, in response to the ON operation signal SG2 based on the operation, the control circuit 11 executes the illumination control processing operation. When the count value of the counter in the control circuit 11 is "3", for example, the control circuit 11 enters the full illumination mode and supplies the first and second illumination control signals CT1 and CT2 to the first and second illumination driving circuits 6 and 7, respectively. As a result, the first to third light emitting diodes D1 to D3 are all illuminated.

The control circuit 11 receives the present battery voltage Vb of the rechargeable battery B from the voltage detection circuit 9 and compares the battery voltage Vb with the second reference voltage value Vk2 stored in the memory 11a in the control circuit 11. Then, the control circuit 11 eliminates the first and second illumination control signals CT1 and CT2 in order to deactivate all of the first to third light emitting diodes D1 to D3 when the battery voltage Vb of the rechargeable battery B reaches the second reference voltage value Vk2.

As a result, even if the motor M is driven by the operation of the trigger switch SW2 in the state in which the first to third light emitting diodes D1 to D3 are all illuminated, the rechargeable battery B is prevented from being over-discharged.

That is, even if the discharge characteristic changes from the characteristic line L2 to the characteristic line L1, the battery voltage Vb does not become less than or equal to the first reference voltage value Vk1 and the rechargeable battery B is not immediately over-discharged. Further, even if the motor M is driven, the battery voltage Vb of the rechargeable battery B is held at the first reference voltage value Vk1 or greater. This ensures that the constant voltage circuit 4 generates the operation voltage Vd for operating the control circuit 11. Therefore, even if the motor M is driven, the control circuit 11 will not be erroneously operated by a decreased in the operation voltage Vd.

The control circuit 11 executes the third over-discharging restriction processing operation in the same manner by using the third reference voltage value Vk3 in the one-point illumination mode and executes the fourth over-discharging restriction processing operation in the same manner by using the fourth reference voltage value Vk4 in the two-point illumination mode.

Then, even if the motor M is driven in the one-point illumination mode or in the two-point illumination mode, the rechargeable battery B is not immediately over-discharged and the control circuit 11 is not erroneously operated by a decrease in the operation voltage Vd.

Further, when an illumination mode in which the load is small is switched to an illumination mode in which the load is large under a situation in which the motor M is not driven, over-discharging of the rechargeable battery B and erroneous operation of the control circuit 11 may be obviated in the same manner. Even if the one-point illumination mode is switched to the two-point illumination mode or the two-point illumination mode is switched to the full illumination mode, the rechargeable battery B does not become over-discharged and the control circuit 11 is not erroneously operated by a decrease in the operation voltage Vd.

The electric power tool 1 of the present embodiment has the advantages described below.

(1) In addition to the first reference voltage value Vk1 set for when driving the motor M, which has a large load, the second to fourth reference voltage values Vk2 to Vk4 are set for the illumination modes, in which the load of is smaller than the motor M. This obviates over-discharging.

Even if the motor M, which has a large load, is driven in the illumination modes and changes the discharge characteristics to characteristic line L1, the second to fourth reference voltage values Vk2 to Vk4 of the illumination modes are set so that the battery voltage Vb does not become less than the first reference voltage value Vk1.

Accordingly, even if the motor M is driven and the characteristic line of the illumination mode changes from the corresponding one of the characteristic lines L2 to L4 to the characteristic line L1, over-discharging of the rechargeable battery B and the erroneous operation of the control circuit 11 are obviated.

(2) In the above-described embodiment, the second to fourth reference voltage values Vk2 to Vk4 are set for the illumination modes, in which the load is smaller than the load of the motor M. Even if the discharge characteristics changes when a illumination mode changes to another illumination mode in which the load is larger than the previous illumination mode, the second to fourth reference voltage values Vk2 to Vk4 for the illumination modes are set so that the battery voltage Vb does not become less than the reference voltage value for an illumination mode having a large load.

Accordingly, even if the illumination mode changes from one in which the load is relatively small to one in which the load is relatively large, over-discharging of the rechargeable battery B and erroneous operation of the control circuit 11 may be obviated.

It should be apparent to those skilled in the art that the present invention may be embodied in many other specific forms without departing from the spirit or scope of the invention. Particularly, it should be understood that the present invention may be embodied in the following forms.

In the above-described embodiment, each of the illumination modes is selected by the number of times the light switch SW3 is operated. This may be changed such that a selection switch is provided for each of the illumination modes, and the desired illumination mode is set by selecting one of the switches.

In the above-described embodiment, the electric power tool provided with an illuminating device including the first to third light emitting diodes D1 to D3. Instead, the present invention may be applied to an electric power tool provided with a dust collector that collects, for example, chips produced by the electric power tool.

In the above-described embodiment, the electric power tool 1 operates in the illumination modes of the first to third light emitting diodes D1 to D3 (three loads) and the driving mode of the motor M (one load). Instead, the electric power tool may function so that the single motor M is operated in a high load mode driven with a high load and in a low load mode driven with a low load. A reference voltage value is set for the high load mode, and a reference voltage value is set for the low load mode.

In this case, the reference voltage value for the low load mode is set so that the battery voltage Vb does not become less than the reference voltage value for the high load mode even after the low load mode is switched to the high load mode thereby changing the discharge characteristics.

In the above-described embodiment, the rechargeable battery B is a lithium ion battery. However, any rechargeable battery can be used as long as the battery has the discharge characteristics described above.

In the above-described embodiment, in order to prevent over-discharging, driving of the motor M is stopped when the first reference voltage value Vk1 is reached. This may be changed so that instead of stopping the motor M, the diodes D1 to D3 are intermittently activated or a buzzer generates noise to notify and prompt the user to, for example, deactivate the motor M. That is, the control circuit 11 issues a notification for the user to deactivate the load.

Further, the light emitting diodes D1 to D3 are deactivated whenever reaching any one of the second to fourth reference voltage values Vk2 to Vk4. This may be changed so that instead of deactivating the light emitting diodes D1 to D3, the light emitting diodes D1 to D3 are activated or a buzzer generates noise to notify and prompt the user to, for example, deactivate the light emitting diodes D1 to D3.

In the above-described embodiment, the electric power tool may be a drill, a drill driver, an impact driver, an impact wrench, a hammer drill, a jigsaw, or the like.

The present disclosure includes the embodiments described below.

Embodiment 1

An electric power tool that receives driving power from a rechargeable battery includes loads (M, D1, D2, D3) and a control circuit (11) that controls supply of the driving power from the rechargeable battery to the loads. The control circuit sets and stores for each of the loads a reference voltage value of the rechargeable battery used for stopping the supply of the driving power to the rechargeable battery or issuing a notification in order to obviate over-discharging of the rechargeable battery.

Embodiment 2

The control circuit sets a relatively large reference voltage value for a relatively small one of the loads.

Embodiment 3

The loads include a largest one and at least a smaller one that is smaller than the largest one. The control circuit is configured to set the reference voltage for the smaller one of the loads to the reference voltage for the largest one of the loads or greater when the supply of driving power is switched from the smaller one of the loads to the largest one of the loads.

Embodiment 4

The electric power tool further includes operation switches (SW2, SW3) corresponding to the loads. The control circuit is configured to supply the driving power from the rechargeable battery to the load selected by operation of one of the operation switches.

Embodiment 5

When the operation of one of the plurality of operation switches selects the load, the control circuit specifies a reference voltage value for the selected load. When a battery voltage of the rechargeable battery reaches the specified reference voltage value, the supply of the driving power from the rechargeable battery to the selected load is stopped or a notification is issued.

Embodiment 6

The loads include a motor (M) that drives at least the electric power tool and an illumination unit (D1, D2, D3) that illuminates the front of the electric power tool.

The present examples and embodiments are to be considered as illustrative and not restrictive, and the invention is not to be limited to the details given herein, but may be modified within the scope and equivalence of the appended claims.

The invention claimed is:

1. An electric power tool that receives driving power from a rechargeable battery, comprising:
   a plurality of loads, wherein the plurality of loads includes at least one load that is smaller than the other one or more loads;
   a voltage detection circuit configured to detect a battery voltage of the rechargeable battery;
   a control circuit that includes a memory configured to store, for each of multiple operation modes of the plurality of loads, a reference voltage value of the rechargeable battery, wherein some of the multiple operation modes include operation of the at least one load and one or more of the other loads, and wherein the control circuit is configured to compare the reference voltage values with the battery voltage received from the voltage detection circuit; and
   a plurality of operation switches corresponding to the plurality of loads,
   wherein when an operation mode including operation of the at least one load and one or more of the other loads is selected by operation of one of the plurality of operation switches, the control circuit is configured to supply a driving power from the rechargeable battery to one or more of the loads being operated in the selected operation mode and read a reference voltage value corresponding to the selected operation mode from the stored reference voltage values,
   and
   wherein when the battery voltage decreases and reaches the reference voltage value corresponding to the selected operation mode, the control circuit is configured to stop the supply of the driving power from the rechargeable battery to the one or more of the loads being operated in the selected operation mode or issue a notification in order to obviate over-discharging of the rechargeable battery,
   wherein the reference voltage value is used to detect a battery voltage immediately before the rechargeable battery is over-discharged,
   wherein the other one or more loads include(s) a motor and the at least one load includes at least one illumination unit of a plurality of illumination units, wherein the multiple operation modes include at least a first operation mode and a second operation mode, and wherein a load current flowing through the at least one illumination unit operated in the second operation mode is smaller than a load current flowing through the motor, two or more of the plurality of illumination units, or the combination thereof operated in the first operation mode, and wherein the memory stores a first reference voltage value for the first operation mode, and stores a second reference voltage value for the second operation mode, and
   wherein the second reference voltage in the second operation mode in which a relatively small load current is flowed is predetermined to be larger than the first reference voltage in the first operation mode in which a relatively large load current is flowed so that the battery voltage does not become less than first reference voltage even after the second operation mode is switched to the first operation mode.

2. The electric power tool according to claim 1, wherein the second reference voltage value is predetermined to be larger than the first reference voltage value so that the rechargeable battery does not immediately become overdischarged when the at least one load and the other one or more loads are operated in the first operation mode.

3. The electric power tool according to claim 2, wherein the other one or more loads include(s) a largest one and the at least one load includes at least a smaller one that is smaller than the largest one, and the second reference voltage for the second operation mode including operation of the smaller one is predetermined to be larger than the first reference voltage for the first operation mode including operation of the largest one of when the supply of driving power is switched from the smaller one to the largest one.

4. The electric power tool according to claim 1, wherein the motor is configured to drive at least the electric power tool and the illumination unit is configured to illuminate the front of the electric power tool.

\* \* \* \* \*